(12) United States Patent
Chhuor et al.

(10) Patent No.: US 11,822,665 B2
(45) Date of Patent: Nov. 21, 2023

(54) COMPUTING APPARATUS CONFIGURABLE FOR SECURED BOOT

(71) Applicant: LENOVO ENTERPRISE SOLUTIONS (SINGAPORE) PTE. LTD., New Tech Park (SG)

(72) Inventors: CheKim Chhuor, New Tech Park (SG); Caihong Zhang, New Tech Park (SG)

(73) Assignee: Lenovo Enterprise Solutions (Singapore) Pte. Lte., New Tech Park (SG)

( * ) Notice: Subject to any disclaimer, the term of this patent is extended or adjusted under 35 U.S.C. 154(b) by 230 days.

(21) Appl. No.: 17/237,698

(22) Filed: Apr. 22, 2021

(65) Prior Publication Data

US 2021/0334382 A1    Oct. 28, 2021

(30) Foreign Application Priority Data

Apr. 22, 2020   (CN) .......................... 202010321624.9

(51) Int. Cl.
| | | |
|---|---|---|
| *G06F 21/57* | (2013.01) | |
| *G06F 21/44* | (2013.01) | |
| *G01S 19/48* | (2010.01) | |
| *G06F 21/71* | (2013.01) | |

(52) U.S. Cl.
CPC ............ *G06F 21/575* (2013.01); *G01S 19/48* (2013.01); *G06F 21/44* (2013.01); *G06F 21/572* (2013.01); *G06F 21/71* (2013.01); *G06F 2221/2111* (2013.01); *G06F 2221/2129* (2013.01)

(58) Field of Classification Search
CPC ...... G06F 21/575; G06F 21/44; G06F 21/572; G06F 21/71; G06F 2221/2111; G01S 19/48
See application file for complete search history.

(56) References Cited

U.S. PATENT DOCUMENTS

| | | | |
|---|---|---|---|
| 2012/0151223 A1* | 6/2012 | Conde Marques | ........................ G06F 21/6218 713/193 |
| 2013/0243189 A1* | 9/2013 | Ekberg | .................. H04L 63/123 380/44 |
| 2015/0074834 A1* | 3/2015 | Wang | ...................... G06F 21/78 726/36 |
| 2021/0049280 A1* | 2/2021 | Koshy | ................... H04W 12/08 |

\* cited by examiner

*Primary Examiner* — Nelson S. Giddins
(74) *Attorney, Agent, or Firm* — Kunzler Bean & Adamson

(57) ABSTRACT

Methods, apparatus, and computer program products for configurable secure boots are disclosed. One method includes determining, by a processor of a computing apparatus, whether a geographical location of the computing apparatus corresponds to a predetermined location, performing a boot process for booting up the computing apparatus in response to the geographical location of the computing apparatus corresponding to the predetermined location, and disabling the boot process from booting up the computing apparatus in response to the geographical location of the computing apparatus failing to correspond to the predetermined location. Computing apparatus and computer program products for performing the method are also disclosed.

20 Claims, 9 Drawing Sheets

COMPUTING APPARATUS CONFIGURABLE FOR SECURED BOOT

REFERENCE TO RELATED APPLICATION

This application claims priority to Chinese Patent Application No. 202010321624.9, filed on Apr. 22, 2020, the contents of which are incorporated herein by reference, in their entirety.

FIELD

The subject matter disclosed herein relates to the security of electronic devices, and more specifically, to a computing apparatus configurable for secured boot.

BACKGROUND

Conventional installation of electronic devices, such as servers or other Internet of Things (IoT) devices, typically involves shipping the electronic device from the manufacturer to various locations designated by the customer. The electronic device may be pre-configured to carry confidential information. There is therefore a need to provide an apparatus configured with a secured boot to help guard against and/or prevent unauthorized access and/or attempts to access such confidential information after the apparatus leaves the factory.

BRIEF SUMMARY

Various embodiments provide computing apparatus, methods, and computer program products configurable for secured boot are disclosed herein. One computing apparatus includes a controller and a memory configured to store code executable by the controller. The code executable by the controller causes the controller to determine whether a geographical location of the computing apparatus corresponds to a predetermined location, perform a boot process for booting up the computing apparatus in response to the geographical location of the computing apparatus corresponding to the predetermined location, and disable the boot process from booting up the computing apparatus in response to the geographical location of the computing apparatus failing to correspond to the predetermined location.

Methods for configurable secure boots are also disclosed herein. One method includes determining, by a processor of a computing apparatus, whether a geographical location of the computing apparatus corresponds to a predetermined location, performing a boot process for booting up the computing apparatus in response to the geographical location of the computing apparatus corresponding to the predetermined location, and disabling the boot process from booting up the computing apparatus in response to the geographical location of the computing apparatus failing to correspond to the predetermined location.

Various embodiments also provide computer program products for configurable secure boots. A computer program product includes a computer-readable storage medium configured to store code executable by a processor. The executable code includes code to perform determining whether a geographical location of a computing apparatus corresponds to a predetermined location, performing a boot process for booting up the computing apparatus in response to the geographical location of the computing apparatus corresponding to the predetermined location, and disabling the boot process from booting up the computing apparatus in response to the geographical location of the computing apparatus failing to correspond to the predetermined location.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
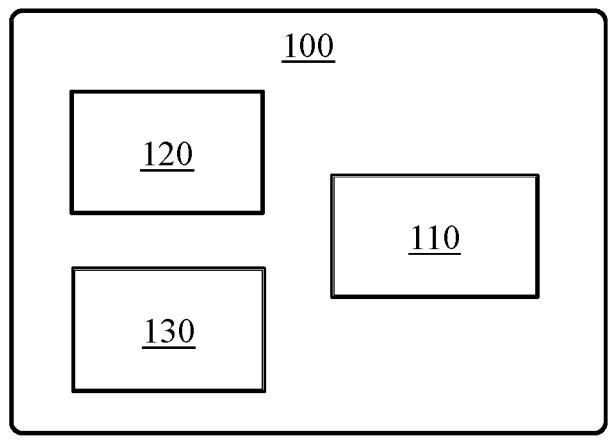
FIG. 1 is a schematic diagram of one embodiment of a computing apparatus configurable for secured boot.

As will be appreciated by one skilled in the art, aspects of the embodiments may be embodied as an apparatus and/or a system. Accordingly, embodiments may take the form of an entirely hardware embodiment or an embodiment combining hardware and software aspects that may all generally be referred to herein as a "circuit," "module" or "system."

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise. The term "and/or"

indicates embodiments of one or more of the listed elements, with "A and/or B" indicating embodiments of element A alone, element B alone, or elements A and B taken together.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding Figures. Like numbers refer to like elements in all Figures, including alternate embodiments of like elements.

The present technology solves at least some of the issues discussed above in the Background section. Specifically, the various embodiments disclosed herein provide a computing apparatus configurable for secured boot. In certain embodiments, the computing apparatus includes a controller configured to determine whether a geographical location of the computing apparatus corresponds to a predetermined location, enable a boot process to boot up the computing apparatus in response to the geographical location of the computing apparatus corresponding to the predetermined location, and disable the computing apparatus from booting up the computing apparatus in response to the geographical location of the computing apparatus not corresponding to the predetermined location.

In some embodiments, the geographical location of the computing apparatus is determined via satellite-based location data. The computing apparatus may further include a satellite receiver coupled to the controller in which the satellite receiver is configured to receive satellite-based location data.

In additional or alternative embodiments, the controller is configured to retrieve data corresponding to the predetermined location from memory. In certain embodiments, the memory is provided in the computing apparatus and the memory is configured with firmware embedding the data corresponding to the predetermined location. In some embodiments, the memory is part of a trusted platform module (TPM) chip disposed in the computing apparatus in which the TPM chip is configured to control retrieval of the data corresponding to the predetermined location from the memory.

In various embodiments, the geographical location of the computing apparatus is a real-time location of the computing apparatus at a time of determining whether the geographical location of the computing apparatus corresponds to the predetermined location. In certain embodiments, the controller is further configured to receive the geographical location of the computing apparatus via an interface during a boot process of the computing apparatus. The geographical location of the computing apparatus, in some embodiments, is received prior to completing the boot process. In various embodiments, the boot process comprises a unified extensible firmware interface (UEFI) boot process.

In certain embodiments, the controller is configured to disable the computing apparatus by terminating the boot process. In additional or alternative embodiments, the controller is configured to disable the computing apparatus by denying permission to continue with the boot process. In further additional or alternative embodiments, the controller is configured to disable the computing apparatus by preventing the computing apparatus from powering ON. The controller, in various embodiments, is configured as a baseboard management controller (BMC).

The data corresponding to the predetermined location, in various embodiments, is derived from satellite-based location data. In certain embodiments, the data corresponding to the predetermined location is a zone derived from satellite-based location data. The controller, in some embodiments, is further configured to determine whether the geographical location of the computing apparatus corresponds to the predetermined location by determining if the geographical location of the computing apparatus is within the zone.

In various embodiments, the controller is configured to receive more than one predetermined location. Here, the controller is further configured to disable the computing apparatus in response to the data corresponding to the geographical location of the computing apparatus not corresponding to the data corresponding to at least one of the more than one predetermined location. The controller, in certain embodiments, is configured to disable the computing apparatus in response to the geographical location of the computing apparatus not corresponding to a last received predetermined location.

Various embodiments further provide a system configurable for secured boot. One system includes a memory for storing data corresponding to a predetermined location and a computing apparatus configurable for secured boot. Here, the computing apparatus may include an interface coupled to a controller in which the controller is configured to retrieve the data corresponding to the predetermined location from memory and receive data corresponding to the geographical location of the computing apparatus through the interface during a boot process of the computing apparatus for comparison against the data corresponding to the predetermined location. In some embodiments, the controller is further configured to send an update to a trusted party upon completion of the boot process.

Embodiments of the present application may be described herein with reference to a server as an example of an electronic device, solely to aid understanding and without intention to limit the scope of the claims. It should be understood that an apparatus configured according to an embodiment of the present disclosure may take the form of a computing apparatus. The computing apparatus may be an IoT device.

A non-limiting description of an IoT device is an electronic device configured to be used with network connectivity. A non-exhaustive list of exemplary IoT devices includes, but is not limited to, servers, computing devices, smart displays, smart speakers, smart meeting room devices (e.g., smart video conferencing devices), smart multimedia devices (e.g., smart televisions), augmented and virtual reality devices, smart docks, smart voice-activated controllers, telecommunications base stations, remote branch servers, automated teller machines, point-of-sale devices, edge computing device, smart home appliances, smart security devices (e.g., smart locks), smart fire alarms, smart monitoring devices (e.g., smart monitoring cameras), cybersecurity hub devices, etc., among other IoT devices that are possible and contemplated herein.

As IoT devices are increasingly embedded with "smart" capabilities and/or customized to the customer/user's needs, the computing apparatus may be pre-configured by the manufacturer (e.g., in the factory) with data even before the computing apparatus is shipped out of the factory. The term "data" is used generally to refer to data and/or instructions, whether in the form of files or embedded. Some of the data pre-configured in the computing apparatus may be confidential or proprietary data. The manufacturer is a trusted party and may thus be required by the customer to pre-configure the computing apparatus with specific data and/or settings. In some cases, the computing apparatus may be pre-configured by another trusted party on behalf of the customer/owner of the computing apparatus. The computing apparatus may leave the manufacturer's premises and be pre-configured by another trusted party before being delivered to the customer for use. In some cases, the computing apparatus may be directly delivered to the customer (or a geographic site designated by the customer) with or without pre-configuration.

Turning now to the Figures, FIG. 1 is an exemplary block diagram of one embodiment of a computing apparatus 100. At least in the illustrated embodiment, the computing apparatus 100 includes, among other components, a controller 110 configured to perform a boot method. The boot method, in various embodiments, includes determining whether a geographical location of the computing apparatus 100 corresponds to a predetermined location, enabling a boot process to boot up the computing apparatus 100 in response to the geographical location of the computing apparatus 100 corresponding to the predetermined location, and disabling the boot process from booting up the computing apparatus 100 in response to the geographical location of the computing apparatus 100 not corresponding to the predetermined location.

In some embodiments, the computing apparatus 100 may include a controller 110 configured to perform a boot method. The boot method, in certain embodiments, includes the controller 110 determining whether a boot location of the computing apparatus 100 corresponds to a predetermined location, enabling a boot process to boot up the computing apparatus 100 in response to the geographical location of the computing apparatus 100 corresponding to the predetermined location, and disabling the boot process from booting up the computing apparatus 100 in response to the boot location of the computing apparatus 100 not corresponding to the predetermined location. In other words, if the geographical location of the computing apparatus 100 corresponds to the predetermined location, the boot process boots up the computing apparatus 100. In another example, in response to the geographical location of the computing apparatus 100 corresponding to the predetermined location, the computing apparatus 100 can be enabled.

In various embodiments, the computing apparatus 100 may include a controller 110. The controller 110, in certain embodiments, is configured to execute a boot method for the computing apparatus 100. In some embodiments, the boot method includes determining whether a geographical location of the computing apparatus 100 corresponds to a predetermined location and disabling the computing apparatus 100 in response to determining that the geographical location of the computing apparatus 100 does not correspond to the predetermined location.

In some embodiments, if the geographical location is determined to not correspond to the predetermined location before the boot process of the computing apparatus 100 is completed, the computing apparatus 100 is disabled (e.g., the computing apparatus 100 is not able to boot up). In additional or alternative embodiments, in a situation in which a geographical location of the computing apparatus 100 does not correspond to a predetermined location, the boot process cannot boot up the computing apparatus 100. In the present disclosure, terms such as "disable," "cannot boot up," "cannot initialize," and "cannot power on" can be used interchangeably.

Figure 2:
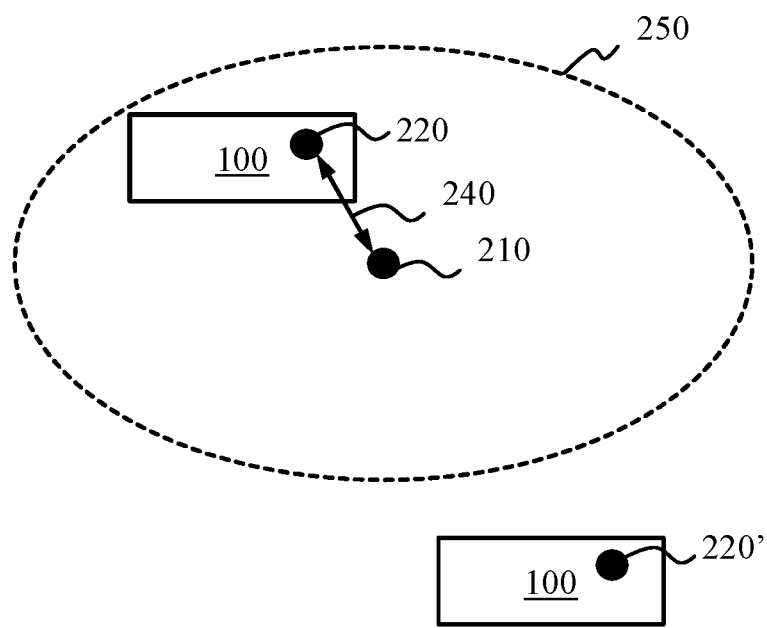
FIG. 2 illustrates one example of a boot location of the computing apparatus of FIG. 1.

Referring to FIG. 2, the geographical location 220, 220' of the computing apparatus 100 at any one time can refer to the physical location of the computing apparatus 100 at that time. The geographical location 220, 220' of the computing apparatus 100 is preferably determined from satellite-based positioning data, although the geographical location can be obtained via any other suitable method and/or technique.

The geographical location 220, 220' of the computing apparatus 100 may be described or defined in terms of coordinates, such as longitude and latitude coordinates. The geographical location 220, 220' of the computing apparatus 100 may further be described or defined in terms of altitude or elevation. The geographical location 220, 220' of the computing apparatus 100 may be described as a location point or a zone. Examples of a zone may include an area about a given location point or an area defined by a boundary. Examples of a zone may include a three-dimensional space, such as a space defined by certain levels of a building.

The predetermined location 210 for a computing apparatus 100 refers to a geographical location predetermined as an intended physical location for the computing apparatus 100. In one example, the predetermined location 210 may be the intended destination of a computing apparatus 100 that is to be delivered out of a secured site. In one example, the predetermined location 210 may be predetermined by the customer or owner of the computing apparatus 100. For example, an organization may have bought a number of servers to be installed in a server room, in which case the server room may be designated as the predetermined location 210.

In another example, a contractor may be required to set up several servers, each at a different retail outlet for a customer. Each server may be configured to receive only one predetermined location 210 that corresponds to one of the retail outlets. Alternatively, each server may be configured to receive a plurality of predetermined locations 210 corresponding to the possible retail outlets where the server may be installed. In yet another example, a computing apparatus 100 may be allocated to a first predetermined location 210 at one time, and at a later time, the same computing apparatus 100 may be allocated to a second predetermined location 210.

A boot location may also refer to the geographical location 220, 220' of the computing apparatus 100 at a time when an attempt is made to boot up, initialize, or power up the computing apparatus 100. As can be appreciated, the boot location is an example of the geographical location 220, 220' of the computing apparatus 100 and can be referred to herein as a boot location 220, 220'.

Continuing with the earlier example, if the servers have been safely delivered to the server room, the servers would have been initialized or booted up when they are in the server room. In such a situation, the boot location 220 would correspond to the predetermined location 210. If there is an attempt to boot up a server when the server is not in the server room, it can be appreciated that the boot location 220' would not correspond to the predetermined location 210. This can be a situation in which there is an unauthorized attempt to access data in the server.

According to various embodiments, the computing apparatus 100 includes, among other components, a memory 120. The memory 120, in certain embodiments, is provided as at least a portion of the controller 110. The memory 120 may be provided in the computing apparatus 100 and is coupled to the controller 110.

The controller 110, in some embodiments, is configured to retrieve data and/or instructions from the memory 120. The term "memory" and "storage" are used interchangeably in this application to refer broadly to a device configured to store data. The memory may be temporary (such as in the form of volatile memory device) or permanent (such as in the form of a solid-state drive), and the memory may be internal (such as disposed within the computing apparatus or embedded in the firmware of the computing apparatus). Examples of memory/storage may include, but are not limited to, read-only memory (ROM), electronically erasable programmable read-only memory (EEPROM), flash memory, non-volatile random-access memory (NVRAM), dynamic random-access memory, solid state drive, hard drive, etc., among other types of memory that are possible and contemplated herein.

In various embodiments, the computing apparatus 100 is configured with the predetermined location 210 stored in the memory 120 of the computing apparatus 100. The predetermined location 210 may be provided to the computing apparatus 100 at an earlier time, for example, before the computing apparatus 100 is delivered to the predetermined location 210, or at a later time.

Figure 3:
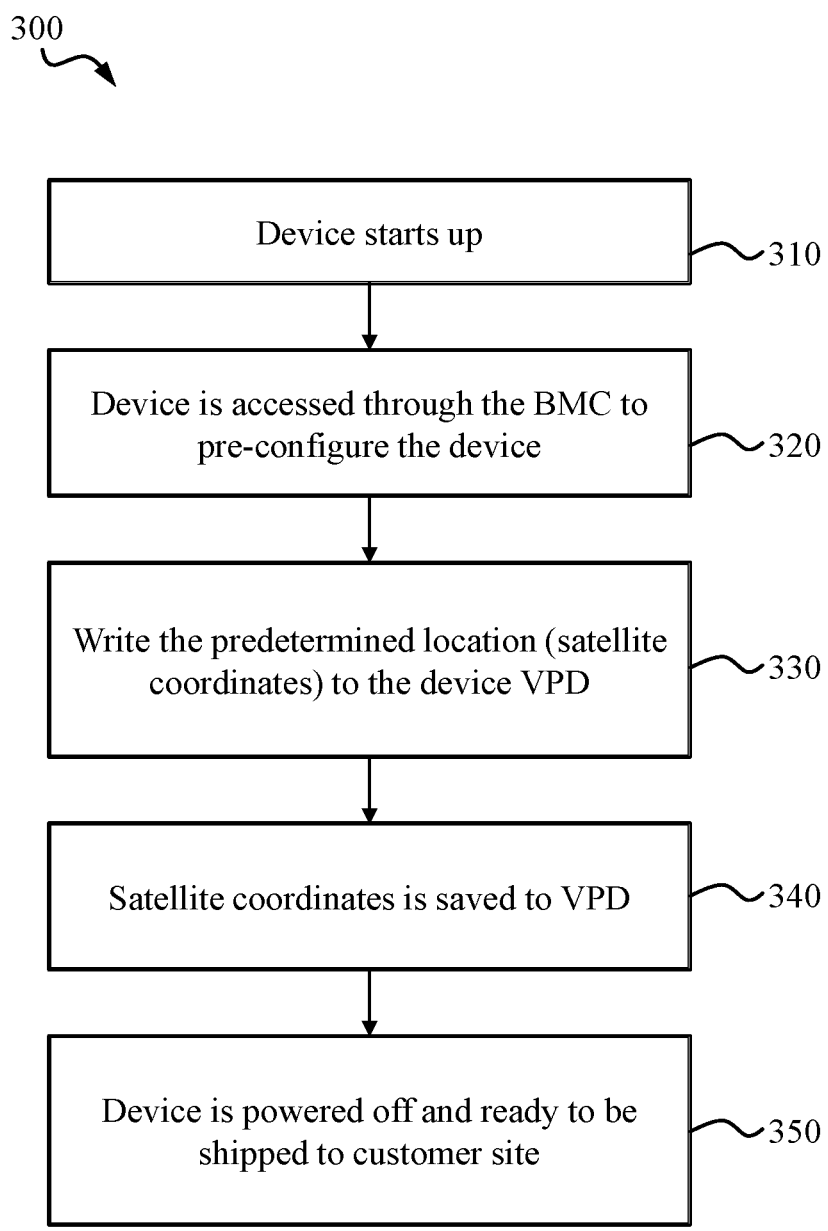
FIG. 3 is a flowchart diagram of one example configuration of the computing apparatus of FIG. 1.

One example of a predetermined location 210 is described with reference to a method 300 illustrated in FIG. 3. A trusted party (e.g., the manufacturer of the computing apparatus 100) may provide the computing apparatus 100 with a predetermined location 210. The computing apparatus 100 may be powered ON to start up the computing apparatus 100 (block 310) and the predetermined location 210 may be provided to the computing apparatus 100 through an interface 130. In method 300, the interface 130 is a baseboard management controller (BMC) interface that accesses the computing apparatus 100 (block 320).

The predetermined location 210 is written to the memory 120 in the computing apparatus 100 (block 330). The predetermined location 210 may be stored/saved in an on-board memory 120 as part of a vital product data (VPD) (block 340). The predetermined location 210 can thus be received/retrieved by the controller 110 from the memory through a suitable interface 130 (e.g., a universal serial bus (USB), an inter-integrated circuit (I2C), etc., among other interfaces that are possible and contemplated herein). After the predetermined location 210 is provided, the computing apparatus 100 may be powered OFF (block 350).

The controller 110 may be configured so that the next time an attempt is made to power ON or boot up the computing apparatus 100, the controller 110 will check/determine if the computing apparatus 100 has been provided with a predetermined location 210. Since the controller 110 will find that the computing apparatus 100 has been provided with a predetermined location 210, the controller 110 will receive/retrieve the predetermined location 210 from the memory 120, and determine if the geographical location 220, 220' of the computing apparatus 100 corresponds to the predetermined location 210.

Figure 4:
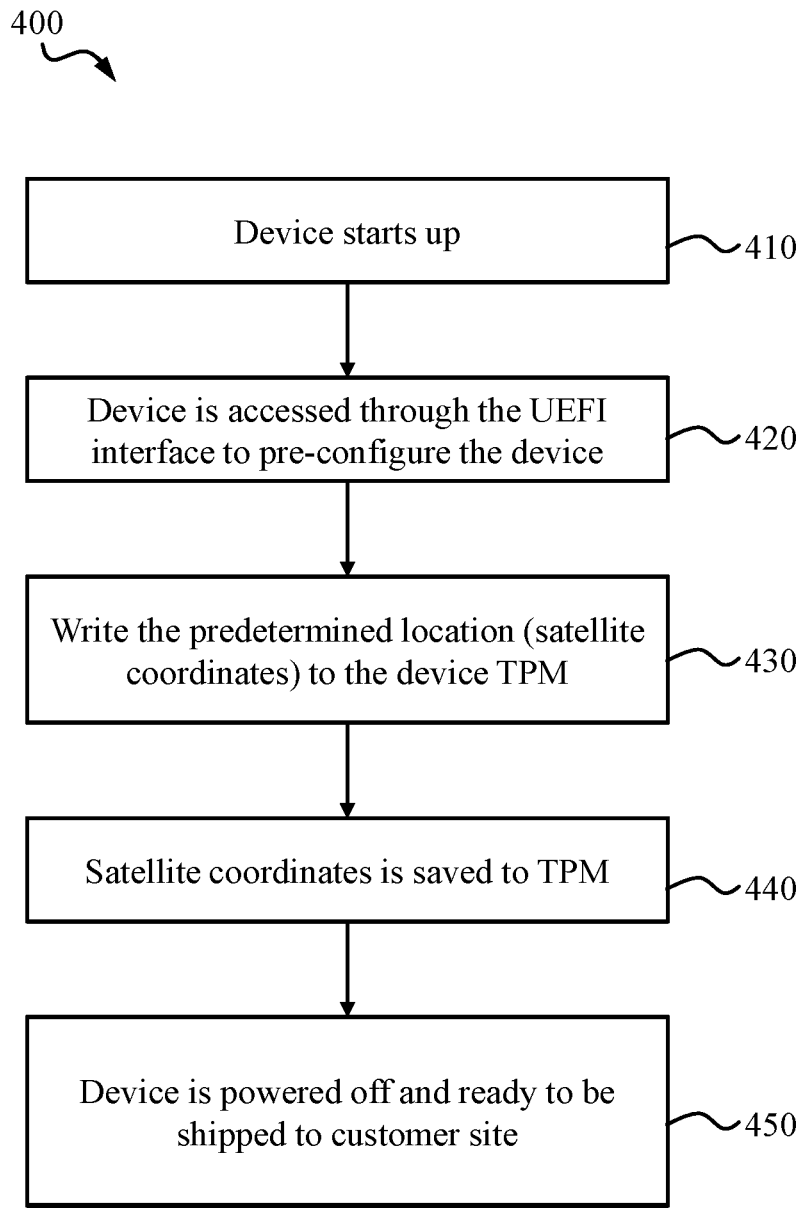
FIG. 4 is a flowchart diagram of another example configuration of the computing apparatus of FIG. 1.

Another example is described with reference to FIG. 4. A trusted party (e.g., the manufacturer of the computing apparatus 100) may provide the computing apparatus 100 with a predetermined location 210. The computing apparatus 100 may be powered ON (block 410) and the predetermined location 210 may be provided to the computing apparatus 100 through an interface 130 (e.g., through the baseboard management controller (BMC) interface and/or unified extensible firmware interface (UEFI) (block 420).

The predetermined location 210 is written to the memory 120 in the computing apparatus 100, in which the memory 120 is part of a trusted platform module (TPM) chip (block 430). The predetermined location 210 can thus be received/retrieved by the controller 110 from the TPM chip through a suitable interface (block 440) (e.g., a universal serial bus (USB), an inter-integrated circuit (I2C), etc., among other interfaces that are possible and contemplated herein).

After the predetermined location 210 is provided, the computing apparatus 100 may be powered OFF (block 450). The controller 110 may be configured so that the next time an attempt is made to power ON or boot up the computing apparatus 100, the controller 100 will check/determine if the computing apparatus 100 has been provided with a predetermined location 210. Since the controller 110 will find that the computing apparatus 100 has been provided with a predetermined location 210, the controller 110 will receive/retrieve the predetermined location 210 from the memory 130 and determine if/whether the geographical location 220, 220' of the computing apparatus 100 corresponds to the predetermined location 210.

According to embodiments of the present disclosure, the computing apparatus 100 may be configured to receive the predetermined location 210 outside the factory configuration environment. For example, a computing apparatus configured according to one embodiment of the present disclosure may be delivered to a first location without having a predetermined location already stored therein. A Smartcard may be separately provided to the computing apparatus at the first location, for example, the Smartcard may be securely and separately delivered to the first location. The controller of the computing apparatus may be configured such that, when an attempt is made to boot up or power on the computing apparatus, the controller of the computing apparatus seeks to receive/retrieve a predetermined location from the Smartcard coupled to the computing apparatus through a suitable interface. The controller of the computing apparatus can then determine if the geographical location of the computing apparatus at that time corresponds to the predetermined location, that is to say, whether the first location corresponds to the predetermined location.

The computing apparatus 100 includes at least one interface 130 coupled to the controller 110. In various embodiments, the interface(s) 130 is/are configured for transmission of satellite-based location data directly or indirectly to the controller 110. In some embodiments, each interface 130 may be in the form of a USB or I2C coupling between the controller 110 (e.g., a baseboard management controller BMC, a central processor unit CPU, etc.) and a TPM chip, as described elsewhere herein. In certain embodiments, the interface 130 may be in the form of a BMC interface through which satellite-based location data may be embedded in the computing apparatus 100 and eventually received by the controller 110 for use.

In some embodiments, the interface 130 includes a Smartcard interface through which the controller 110 can receive/retrieve satellite-based location data from a Smartcard, as described elsewhere herein. In various embodiments, the interface 130 is an interface suitable for coupling to a network and/or other devices (e.g., keyboards, mice, cameras, phones, storage, players, receivers, etc.) to receive input or provide output.

According to various embodiments, the computing apparatus 100 may be configured so that upon an attempt being made to boot up or power ON the computing apparatus 100, the controller 110 will seek the geographical location 220, 220' of the computing apparatus 100 at that time. The controller 110 may be configured to receive the geographical location 220, 220' of the computing apparatus 100 through the interface 130 when performing a boot process of the computing apparatus 100.

The controller 110, in some embodiments, may be configured to determine the geographical location 220, 220' of the computing apparatus 100 before completing the boot process. In additional or alternative embodiments, the controller 110 may be configured to receive the geographical location 220, 220' of the computing apparatus 100 prior to completing the boot process.

The computing apparatus 100 may further include an interface 130 in the form of a satellite receiver module 530, 630 in which the satellite receiver module 530, 630 is configured to receive satellite-based signals, calculate the geographical location 220, 220' of the computing apparatus 100, and output the geographical location 220, 220' to the controller 110. In such a manner, the controller 110 can receive satellite-based location data corresponding to the "real-time" geographical location 220, 220' of the computing apparatus 100.

Satellite-based signals/data may be obtained from any one or more of various satellite navigation systems, such as a global navigation satellite system (GNSS), a regional navigation/positioning system, or a local navigation/position system, among other satellite navigation systems that are possible and contemplated herein. A satellite receiver module 530, 630 may be configured to operate with or without additional data/signals from a satellite-based augmentation system. Examples of global navigation satellite systems include, but are not limited to, a Global Positioning System (GPS), a BeiDou Navigation Satellite System (BDS), a Global Navigation Satellite System (GLONASS), and a Galileo system, among other global navigation satellite systems that are possible and contemplated herein.

The computing apparatus 100 may be configured to receive satellite-based positioning data/signals from other systems, such as a Quasi-Zenith Satellite System (QZSS) or a Indian regional Navigation Satellite System (IRNSS), among other types of systems that are possible and contemplated herein. The computing apparatus 100 may be configured to receive satellite-based location data/signals from more than one global navigation/positioning system.

Figure 6:
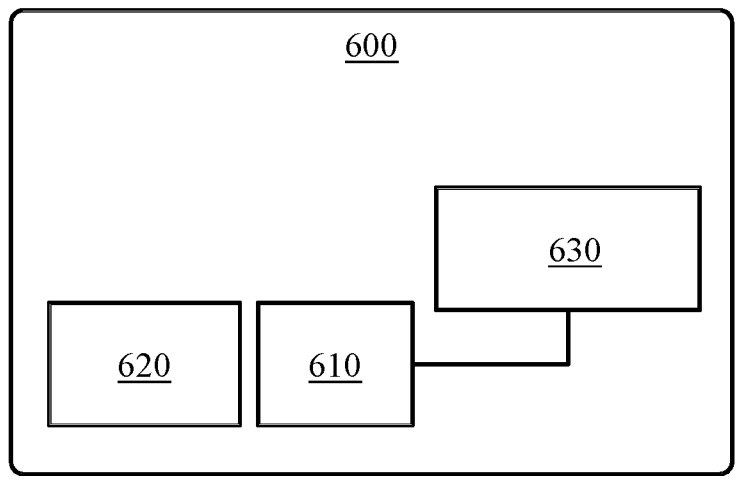
FIG. 6 is a schematic diagram of another example configuration of the computing apparatus of FIG. 1.
Figure 7:
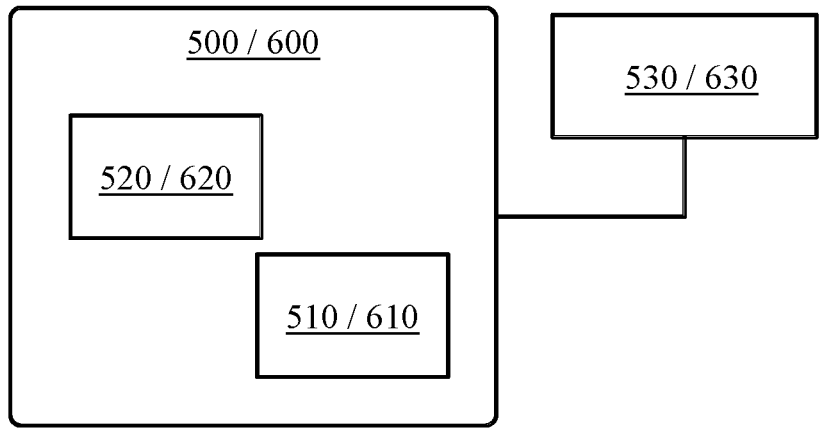
FIG. 7 is a schematic diagram of yet another example configuration of the computing apparatus of FIG. 1.

According to certain embodiments, the satellite receiver module 530, 630 may be an onboard module disposed in the computing apparatus 100 (see, e.g., FIG. 5 and FIG. 6) or the satellite receiver module 530, 630 may be an external module configured to be coupled with the computing apparatus 100 (see, e.g., FIG. 7). In such cases, the satellite-based location data includes output from a satellite receiver module 530, 630 that is receivable by the controller 110.

With some satellite receiver modules 530, 630, the controller 110 may receive the geographical location 220, 220' of the computing apparatus 100 in the form of longitude and latitude coordinates. With other satellite receiver modules 530, 630, the controller 110 may be configured to perform additional steps to obtain the longitude and latitude coordinates.

Satellite-based location data may include longitude, latitude, and/or altitude/elevation data. Satellite-based location data may include geo-spatial positioning signals received by the computing apparatus 100 and/or location/position data calculated using signals received from a satellite navigation system. Satellite-based location data receivable by the controller 110 may therefore refer to navigation/positioning coordinates and/or data from which such coordinates may be derived, in which the location data 210 is based or calculated from satellite signals.

The geographical location 220, 220' of the computing apparatus 100 may be calculated or otherwise derived from geolocation data, navigation/positioning data, etc. Thus, it will be understood that the foregoing is not an exhaustive listing of all possible sources of satellite-based location data receivable by a computing apparatus 100 configured according to the various embodiments of the present disclosure.

In the examples described above, the controller 110 (e.g., the BMC or the CPU) may be configured to receive/retrieve satellite-based location data from the satellite receiver module 530, 630 through a suitable interface. The satellite receiver is configured to receive signals and compute satellite-based location coordinates therefrom.

Alternatively, the computing apparatus 100 according to various embodiments may include an interface configured to provide the computing apparatus 100 with its "real-time" or current geographical location 220, 220' that does not involve direct data transfer from a satellite receiver module to the controller.

Figure 8:
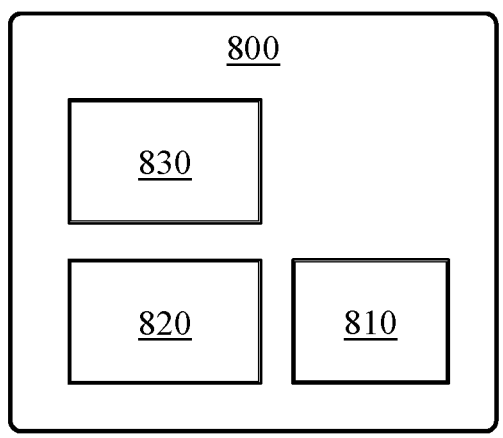
FIG. 8 is a schematic diagram of still another example configuration of the computing apparatus of FIG. 1.

Referring to FIG. 8, for example, a computing apparatus 800 may be a server including a BMC 810, a memory 820, and an interface 830 in the form of at least one peripheral component interconnect (PCI) adaptor. The BMC 810 may be configured to receive the geographical location 220, 220' of the computing apparatus 800 from a peer device (such as another server). Such a configuration may be useful when the predetermined location 210 is one where satellite signals may not be available, that is, where it is not practical to use a satellite receiver module to acquire the "real-time" or current geographical location of the computing apparatus 800. The BMC 810 may be configured to receive the geographical location 220, 220' from a plugged-in interface, such as a USB device or through a software remote service provided by the peer device.

A computing apparatus 800 according to an embodiment of the present disclosure may be configured with a UEFI-compatible boot process. The UEFI may or may not include what is called a "Windows Secured Boot" for validating the operating system.

Figure 5:
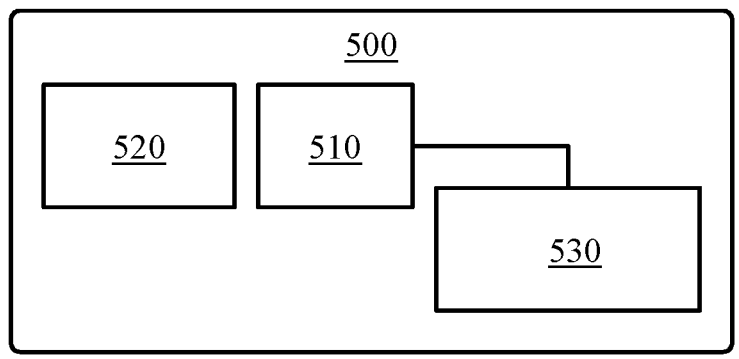
FIG. 5 is a schematic diagram of one example configuration of the computing apparatus of FIG. 1.

To aid understanding, a computing apparatus 500 configured to perform a location validation process 900 will be described with reference to FIGS. 5 and 9, as an example. In this example, the computing apparatus 500 is pre-configured or provided with a predetermined location 210. The predetermined location 210 is stored in a memory 520 that is part of a TPM chip disposed in the computing apparatus 500. A controller 510 is configured with a UEFI in which, at the beginning of the boot process or upon an attempt being made to start up the computing apparatus 500 (block 910), the UEFI checks to determine whether the predetermined location is available or known (block 920).

In this example the TPM chip is configured to control retrieval of the predetermined location 210 from the memory 520. Here, for the sake of brevity, the terms "receive", "retrieve", "obtain" and the like may be used interchangeably. The controller 510 is configured to receive/retrieve the predetermined location 210 from the TPM chip.

The UEFI may be configured to look for a satellite receiver (block 930). In this example, in response to a satellite receiver not being available, the location validation process will terminate the boot process (block 990). In response to the satellite receiver being available, the location validation process will continue. In this embodiment, the controller 510 is able to acquire the geographical location 220, 220' of the computing apparatus 500 through a satellite receiver module (block 950). A satellite receiver module 530 may be an onboard satellite receiver module (see, e.g., FIG. 5) or an external (plugin) device (see, e.g., FIG. 7). That is, the satellite receiver module 530 receives satellite signals enabling it to provide satellite-based location coordinates to the controller 510 so that the controller 510 may be informed of the geographical location 220, 220' of the computing apparatus 500 at that time (e.g., the current location).

The current location refers to the geographical location 220, 220' of the computing apparatus 500 at the time of an attempt to boot up the computing apparatus 500. The current location refers to the geographical location 220, 220' obtained by the satellite receiver during the attempt to boot up the computing apparatus 500. This time may be referred to as the boot process even if the booting up of the computing apparatus 500 is terminated or not completed. The controller 510 is configured to compare the current location against the predetermined location 210 obtained from the TPM chip.

The controller 510 is configured to compare a "real-time" geographical location 220, 220' of the computing apparatus 500 against an intended location 210 of the computing apparatus 500 (block 960). The controller 510 may be configured to determine that the current location 220 corresponds to the predetermined location 210 when the current location 220 matches (e.g., is the same as or is within an acceptable tolerance 240 of the predetermined location 210) the predetermined location 210, as described or defined in coordinates for a point location (block 970).

The controller 510 may be configured to determine that the current location 220 corresponds to the predetermined location 210 in response to the current location 220 being within a range (or distance) 240 of the predetermined location 210. The controller 510 may be configured to define a boundary or zone 250 based on the predetermined location 210, and to determine that the current location 220 corresponds to the predetermined location 210 in response to the current location 220 falling within the boundary or zone.

In various embodiments, the controller 510 is configured to determine if a geographical location 220, 220' corresponds to a predetermined location 210. In some embodiments, the controller 510 is configured to calculate the distance between the geographical location 220 and the predetermined location 210 and to compare the distance with a pre-determined distance.

In response to the distance between the geographical location 220 and the predetermined location 210 being less than or equal to the pre-determined distance, the controller 510 in configured to determine that the computing apparatus 500 is in a safe zone and the boot process can be continued. In response to the distance between the geographical location 220 and the predetermined location 210 being greater than the pre-determined distance, the controller 510 is configured to determine that the computing apparatus 500 is outside the safe zone and the boot process will be disabled.

For example, assuming the predetermined location 220 is at 31° 12' 28" N, 121° 34' 48" E. If the geographical location 220 of the computing apparatus 500 at a particular time is 31° 12' 27" N, 121° 34' 47" E, the controller 510 can determine that the computing apparatus 500 is about 40 meters from the predetermined location 210. In this example, the predetermined distance has been set at 50 meters. The predetermined distance may be set at any distance greater than zero to factor in tolerance and/or accuracy of the available satellite-based location data, the physical environment of the intended installation site, likely variation in the final installation, etc., among other suitable factors that are possible and contemplated herein. Here, since the attempt to boot up the computing apparatus 500 is occurring at about 40 meters away from the given predetermined location 210 (e.g., less than the predetermined distance of 50 meters), the controller 510 can determine that the computing apparatus 500 is at a valid boot location. Hence, the boot process would be continued.

In another example, the geographical location 220' of the computing apparatus 500 is found to be at 31° 12' 26" N, 121° 34' 50" E. The predetermined location 210 of the computing apparatus 500 is 31° 12' 28" N, 121° 34' 48" E. Again, a safe zone is defined as an area including a radius of 50 meters about a center, in which the center is defined by the predetermined location 210 at 31° 12' 28" N, 121° 34' 48" E. The distance between the geographic location 220' and the predetermined location is approximately 80 meters, which means that the computing apparatus 500 at the time is outside the safe zone defined with respect to the predetermined location 210. Therefore, the computing apparatus 500 would be disabled and/or would not be able to boot up successfully.

Figure 9:
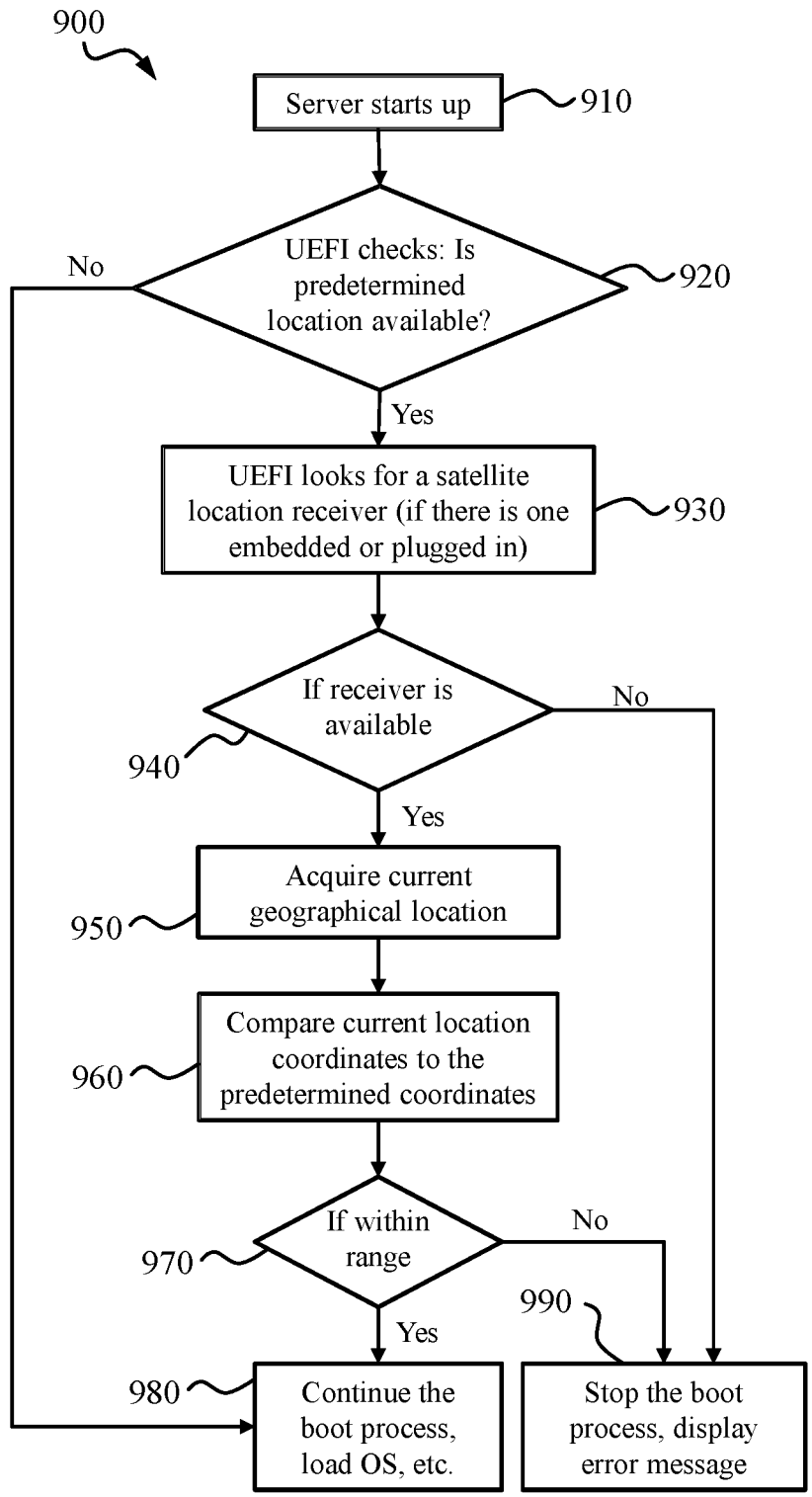
FIG. 9 is a flowchart diagram of one example configuration of the computing apparatus of FIG. 1.

Continuing with the example illustrated in FIG. 9, if the current location 220 has been determined to correspond to the predetermined location 210, the UEFI enables the boot process to continue (block 980). The process described above may take place at an initial part of the boot process. For example, the UEFI may proceed to complete the boot process by loading the operating system. If the current location 220' has been determined to not correspond to the predetermined location 210, the UEFI disables the computing apparatus 500 by terminating the boot process (block 990).

The computing apparatus 500, in some embodiments, includes a controller 510 configured to perform a method involving determining if a geographical location 220, 220' of the computing apparatus 500 corresponds to a predetermined location 210 and disabling the computing apparatus 500 in response to the geographical location 220' of the computing apparatus 500 not corresponding to the predetermined location 210. The controller 510 may be configured to disable the computing apparatus 500 by terminating the boot process.

Alternatively, the controller 510 may be configured to disable the computing apparatus 500 by denying permission to continue with the boot process. The controller 510 may be configured to disable the computing apparatus 500 by preventing the computing apparatus 500 from powering ON. In the event of an unsuccessful boot or a failure to boot up, the controller 510 may be configured to display or otherwise provide an error message.

Figure 10:
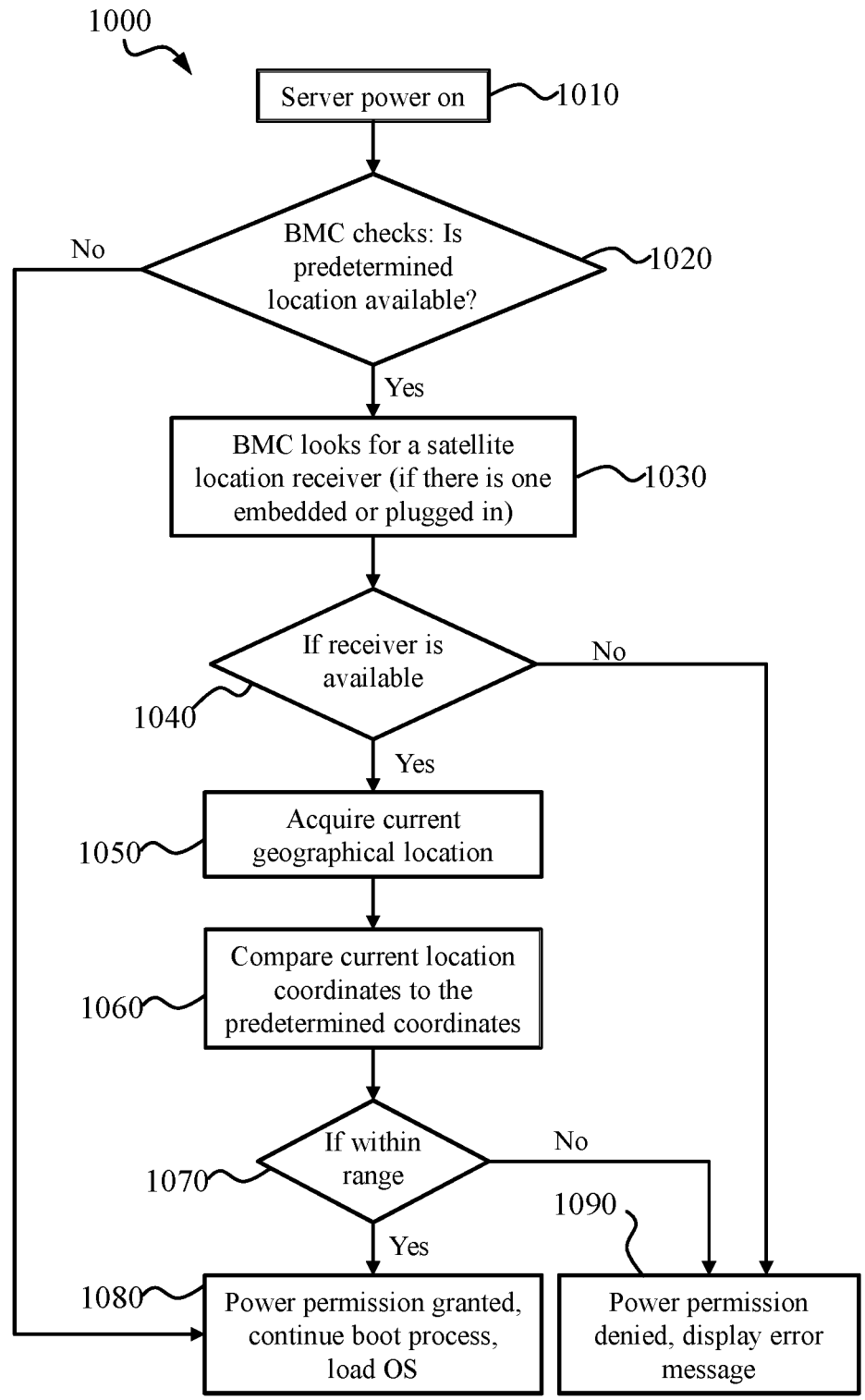
FIG. 10 is a flowchart diagram of another example configuration of the computing apparatus of FIG. 1.

Another embodiment of a computing apparatus 600 configured to perform a location validation process/method 1000 will be described with reference to FIGS. 6 and 10, as an example. In various embodiments, the computing apparatus 600 includes a server configured with a baseboard management controller (BMC) 610 as an example of a controller.

The BMC 610 may be pre-configured or provided with a predetermined location 210. The predetermined location 210 is stored in a memory 620 (e.g., the predetermined location 210 may be embedded in the firmware in a flash memory or an electrically erasable programmable read-only memory (EEPROM) device, among other storage devices that are possible and contemplated herein). The BMC 610 may be configured such that, upon the computing apparatus 600 (server) being powered ON, the BMC 610 first performs an initialization or check to determine power requirements before the computing apparatus 600 (server) is actually enabled for operation.

The BMC 610 may be configured such that, as part of the initialization (block 1010), the BMC 610 performs a boot location validation or a location validation process 1000. The boot location validation or a location validation process 1000 may include determining whether the predetermined location 210 is available or known to the BMC 610 (block 1020). In this embodiment, the BMC 610 may obtain the predetermined location 210 from the firmware, among other locations and/or devices that are possible and contemplated herein. The BMC 610 may be configured to alternatively obtain the predetermined location 210 from a Smartcard, as described elsewhere herein.

The BMC 610, in certain embodiments, may be configured to look for a satellite receiver (block 1030) and determine whether the satellite receiver is available (block 1040). In response to a satellite receiver is not being available (e.g., a "NO" in block 1040), power permission is denied such that the server cannot successfully complete its powering on process (block 1090). In response to a satellite receiver being available (e.g., a "YES" in block 1040), the BMC 610 is able to acquire the geographical location 220, 220' of the computing apparatus 600 through a satellite receiver module 630 (block 1050).

The satellite receiver module 630 may be an onboard satellite receiver module (see, e.g., FIG. 6) or an external (plugin) device (see, e.g., FIG. 7). That is, the satellite receiver module 630 is configured to receive satellite signals enabling the satellite receiver module 630 to provide satellite-based location coordinates to the BMC 610 so that the BMC 610 may receive the geographical location 220, 220' of the computing apparatus 600 at that time (e.g., the current location or the real-time location).

The current location refers to the geographical location 220, 220' of the computing apparatus 600 at the time of powering ON the computing apparatus 600 (server). The current location refers to the geographical location 220, 220' obtained by the satellite receiver during the attempt to power ON the computing apparatus 600 (server). This time may be referred to as the boot process of the computing apparatus 600 (server) regardless of whether the computing apparatus 600 (server) successfully becomes powered ON and operational.

The BMC 610, in some embodiments, is configured to compare the current location 220, 220' against the predetermined location 210 (block 1060). The BMC 610 is configured to compare a real-time geographical location 220, 220' of the computing apparatus 600 (server) against the predetermined location 210 (e.g., an intended location) of the computing apparatus 600 (server). The BMC 610 may be configured to determine that the current location 220 corresponds to the predetermined location 210 when the current location 210 matches, is the same as, or is within an acceptable tolerance of the predetermined location 210, in which the predetermined location 220 is described or defined in coordinates for a point location. The BMC 610 may be configured to determine that the current location 220 corresponds to the predetermined location 210 when the current location is within a range (distance) 240 of the predetermined location 210 (block 1070). The BMC 610 may be configured to define a boundary or zone based on the predetermined location 210 and to determine that the current location 220 corresponds to the predetermined location 210 in response to the current location falling within the boundary or zone 250.

For example, supposing that the geographical location 220 of the computing apparatus 600 (server) is found to be at 31° 12' 26" N, 121° 34' 50" E while the predetermined location 210 of the server is 31° 12' 28" N, 121° 34' 48" E. A safe zone is defined as an area having a radius of 50 meters about a center, in which the center is defined by the predetermined location at 31° 12' 28" N, 121° 34' 48" E. The distance between the boot location and the predetermined location 210 is calculated to be approximately 80 meters, which means that the computing apparatus 600 (server) at the time is at a geographical location 220' that is outside an acceptable range 240 or the safe zone 250 defined with respect to the predetermined location 210. Therefore, the computing apparatus 600 would be disabled. In other words, the computing apparatus 600 would not be able to boot up and/or power ON.

If the current location 220' has been determined to not correspond to the predetermined location 210, the BMC 610 disables the computing apparatus 600 by terminating the boot process, which may include denying power permission so that the computing apparatus 600 (server) cannot be successfully powered ON to become operational. That is, the computing apparatus 600 (server) cannot be booted up through its boot process (block 1090).

The computing apparatus 600 (server) includes a BMC 610 configured to perform a method involving determining whether a geographical location 220, 220' of the computing apparatus 600 (server) corresponds to a predetermined location 210 and disabling the computing apparatus 600 (server) in response to the geographical location 220' of the computing apparatus 600 not corresponding to the predetermined location 210. The BMC 610 may be configured so that, in response to the geographical location 220 corresponding to the predetermined location 210, the computing apparatus 600 (server) may be booted up. That is, the computing apparatus 600 (server) may complete the boot process, initialization process, or a powering ON process so that the computing apparatus 600 (server) can enter and/or begin performing its normal operational state.

The BMC 610 may be configured to disable the computing apparatus 600 (e.g., the server) by terminating a boot process. The BMC 610 may be configured to disable the computing apparatus 600 by denying permission to continue with the boot process. The BMC 610 may be configured to disable the computing apparatus 600 by preventing the computing apparatus 600 from powering ON. In the event of an unsuccessful boot, the BMC 610 may be configured to display or otherwise provide an error message.

In response to the current location 220 being determined to correspond to the predetermined location 210, power permission is granted to the computing apparatus 600 (server) and the boot process is continued (block 1080). For example, after power permission is granted to computing apparatus 600 (server), the operating system of the computing apparatus 600 (server) may be loaded.

The process described above may take place at an initial part of the boot process. For example, the BMC 610 may proceed to complete the boot process by validating the power requirements of other components. For example, assuming the predetermined location 210 is at 31° 12' 28" N, 121° 34' 48" E and the geographical location 220 of the computing apparatus 600 (server) at a time is 31° 12' 27" N, 121° 34' 47" E. The BMC 610 can determine that the computing apparatus 600 (server) is about 40 meters from the predetermined location 210.

In this case, the predetermined distance has been set at 50 meters. The predetermined distance may be set at any suitable distance greater than zero to factor tolerance or accuracy of the available satellite-based location data, the physical environment of the intended installation site, likely variation in the final installation, etc., among other factors that are possible and contemplated herein.

In this case, since the attempt to boot up the computing apparatus 600 (server) is occurring at about 40 meters away from the given predetermined location 210, which less than the predetermined distance of 50 meters, the BMC 610 is configured to determine that the computing apparatus 600 (server) is at a valid boot location (e.g., geographic location 220). Hence, the boot process would be continued.

Figure 11:
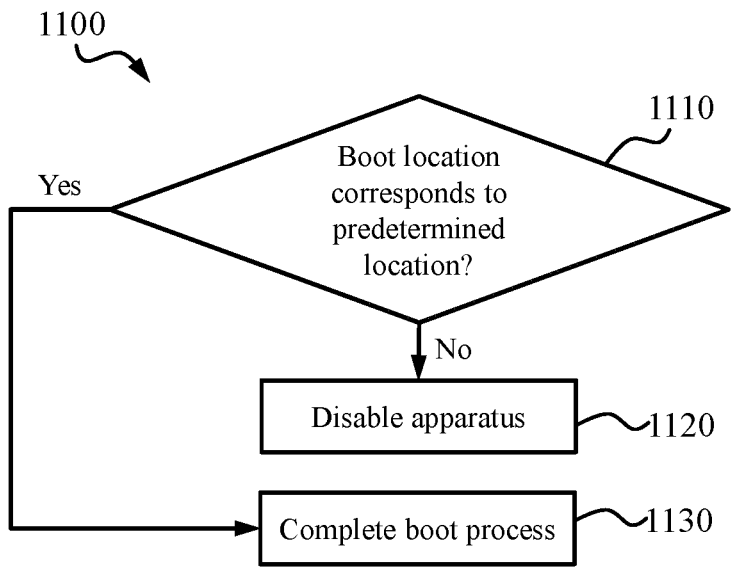
FIG. 11 is a flowchart diagram of yet another example configuration of the computing apparatus of FIG. 1.

A computing apparatus 100, 500 may be configured to perform a location validation process/method 1100 as described in the examples given above. As illustrated by the flowchart diagram of FIG. 11, one example of the location validation process 1100 includes determining if a boot location of the computing apparatus corresponds to a predetermined location 210 of the computing apparatus 100 (block 1110). In response to the boot location (e.g., a geographic location 220') not corresponding to the predetermined location 210 (e.g., a "NO" in block 1110), the boot process of the computing apparatus 100 results in the computing apparatus 100, 500 being disabled (block 1120). In response to the boot location (e.g., a geographic location 220) corresponding to the predetermined location 210 (e.g., a "YES" in block 1110), the boot process results in the computing apparatus 100, 500 being boot up and/or the computing apparatus 100 completing the boot process (block 1130).

Figure 12:
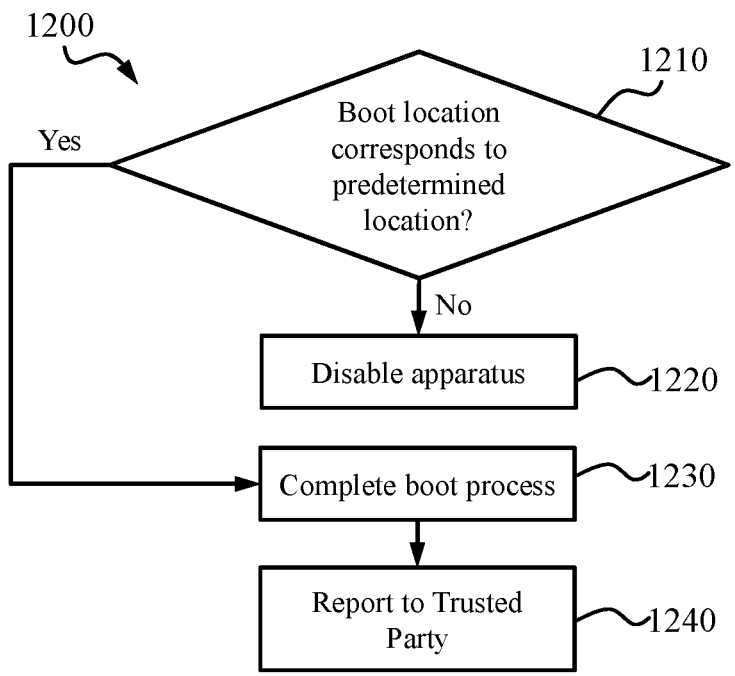
FIG. 12 is a flowchart diagram of an example configuration of a system including the computing apparatus of FIG. 1.

Referring now to FIG. 12, the computing apparatus 600 may include a server configured to perform a location validation process 1200, in which the server is part of a system in which a BMC 610 is configured to send an update to a trusted party (such as a product registration portal, a backend maintenance server, etc.) (block 1240) upon completion of the boot process. The BMC 610 (controller) of the server (computing apparatus 600) may be configured to determine whether a boot location corresponds to a predetermined location 210 (block 1210) and to enable the computing apparatus 600 (server) to be operable (block 1230) only if the boot location (e.g., a geographic location 220) corresponds to the predetermined location 210. The system may be described as including a predetermined location 210 stored in a memory 630 and a server.

The server includes an interface coupled to the BMC 610 and the BMC 610 is configured to retrieve the predetermined location 210 from the memory 630. The BMC 610 is also configured to receive the geographical location 220, 220' of the server through the interface when performing a boot process of the computing apparatus 600 (server).

According to other embodiments, a computing apparatus 600 includes a BMC 610 configured to receive more than one predetermined location 210 (block 1210). The BMC 610 is configured to disable the computing apparatus 100 in response to the geographical location 220' of the computing apparatus 100 not corresponding to at least one of the more than one predetermined location 210 (e.g., a "NO" in block 1210) (block 1220). The BMC 610 may further be configured to disable the computing apparatus 600 in response to the geographical location 220' of the computing apparatus 600 not corresponding to a last received predetermined location.

Referring again to FIGS. 3 and/or 4, in one example, a trusted party (e.g., the manufacturer of a computing apparatus 1300) may at a first time provide the computing apparatus 1300 with a first predetermined location. At the site where the computing apparatus 1300 is pre-configured methods 300, 400, the computing apparatus 1300 may be powered ON 310, 410, and the first predetermined location 1310 (see, e.g., FIG. 13) may be provided to the computing apparatus 1300 through an interface (blocks 320, 420).

In some embodiments, the interface may be a BMC interface and/or unified extensible firmware interface (UEFI). The first predetermined location 1310 can be written to the memory in the computing apparatus 1300 (blocks 330, 430). The first predetermined location 1310 may be stored in an on-board memory as part of the vital product data (VPD) (block 340) or in a TPM chip (block 440). The first predetermined locations 1310 can thus be subsequently received/retrieved by the controller from the memory through a suitable interface, for example, a universal serial bus (USB), an inter-integrated circuit (I2C), etc. After the first predetermined locations 1310 have been provided, the computing apparatus 1300 may be powered OFF (blocks 350, 450).

The controller may be configured so that the next time an attempt is made to power ON or boot up the computing apparatus 1300, the controller will check if the computing apparatus 1300 has been provided with the first predetermined location 1310. The computing apparatus 1300 is configured to boot only at a valid boot location (e.g., a geographic location 220) and/or not to boot at an invalid boot location (e.g., a geographic location 220'). In this example, a valid boot location (e.g., a geographic location 220) may be defined as a boot location within a predetermined distance from the first predetermined location 1310. An invalid boot location (e.g., a geographic location 220') can be defined as a boot location further than a predetermined distance from the predetermined location 1310.

The valid boot location (e.g., a geographic location 220) can also be understood as a boot location within a safe zone defined with reference to the predetermined location 1310. An invalid boot location (e.g., a geographic location 220') can also be understood as a boot location outside the safe zone.

Figure 13:
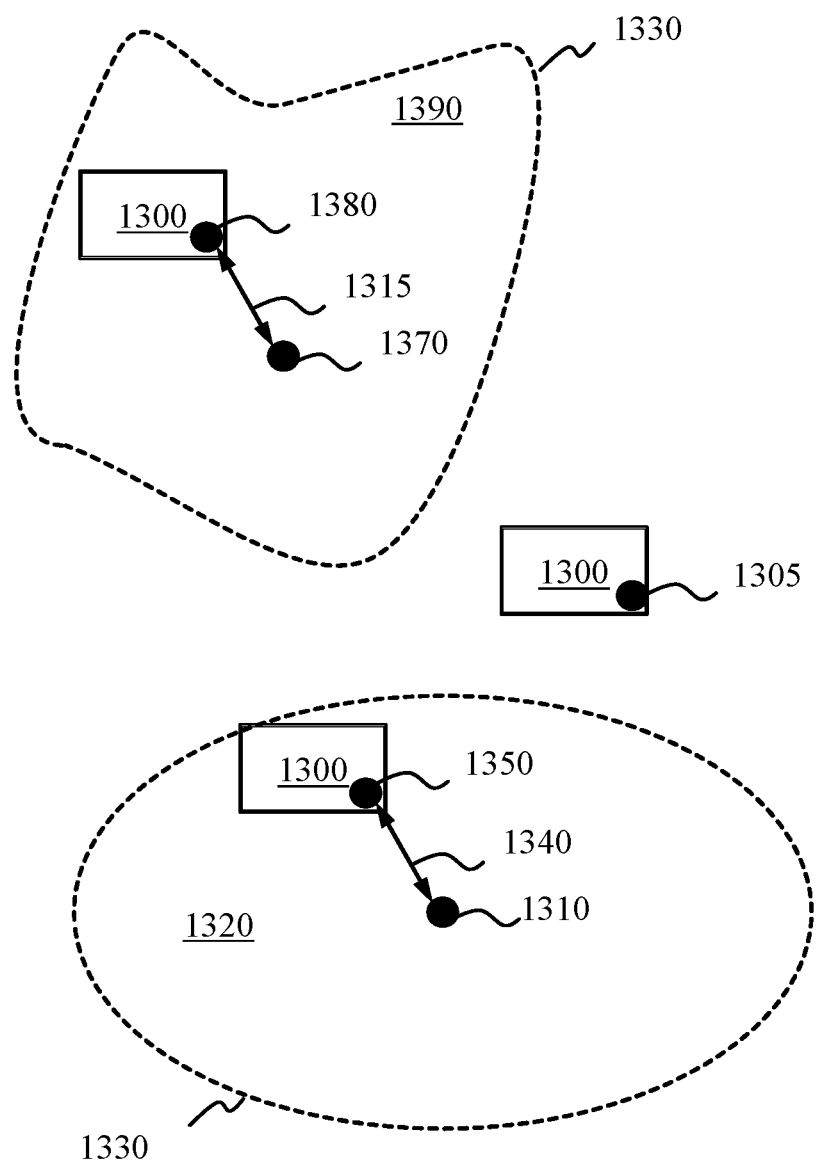
FIG. 13 illustrates an example second boot location for the computing apparatus of FIG. 1.

Referring now to FIG. 13, the computing apparatus 1300 pre-configured with the first predetermined location 1310 is sent to a first site 1350 for installation. At the first site 1350, upon the computing apparatus 1300 being started up or powered ON, the controller checks if the first predetermined location 1310 is available.

The controller may be configured to look in more than one possible device for at least one predetermined location 210. The controller may be configured to look in more than one possible device for at least one predetermined location 210, following a given search sequence.

For example, the controller may be configured to first look for any predetermined location 210 in the TPM chip if such a device is present. If the TPM chip is not available or if the TPM chip does not contain at least one predetermined location 210, the controller may next look for any predetermined location 210 in the firmware. If the firmware does not contain at least one predetermined location 210, the controller may next look for a Smartcard coupled to the computing apparatus 1300, and to check if the Smartcard contains at least one predetermined location 210.

At the first site 1350, as an initial part of the boot process, the controller receives satellite-based global location data from a satellite receiver module or from a peer-to-peer network via the interfaces therebetween. In this case, the controller is able to determine that the first site is a valid boot location 1320 because it is within the safe zone 1330 or because it is within an acceptable range/distance 1340 of the first predetermined location 1310. The boot process is permitted to continue and the computing apparatus 1300 can be successfully installed and operable at the first site.

In this example, the computing apparatus 1300 is moved to a second site 1380 for installation. According to one embodiment, the computing apparatus 1300 may be configured so that it can receive an update to the first predetermined location 1310 stored in the memory of the computing apparatus 1300. The computing apparatus 1300 may be configured to replace the first predetermined location 1310 stored in its memory with a second or an updated predetermined location 1370. The computing apparatus 1300 may be configured to receive more than one predetermined location 210, 1310, 1370, and to use the most recently received predetermined location 210, 1370.

In one example, when the computing apparatus 1300 is operating at the first site 1350, the computing apparatus 1300 may receive a firmware update from a trusted party, in which the firmware update includes an update to the predetermined location 210 stored in the memory. Alternatively, the firmware update may be downloaded from a trusted party's site, such as from a manufacturer or a supplier. After the update, the computing apparatus 1300 may be shut down and transported to another site.

The next time an attempt is made to power ON or boot up the computing apparatus 1300, the controller performs a check for a predetermined location 210 and recognizes a second predetermined location 1370 as a second valid boot location 1390 (e.g., a geographic location 220). Before the power ON or boot up process is completed, the controller obtains the second boot location 1380.

For example, the controller may receive satellite-based global location data from a satellite receiver module or from a peer-to-peer device via the interfaces therebetween. The computing apparatus 1300 is configured to boot only at a second valid boot location 1390 and/or not to boot at an invalid boot location 1305 (e.g., a geographic location 220'). The second boot location 1380 may be a second distance 1315 from the second predetermined location 1370. If the second distance is smaller than a predetermined limit, the second boot location 1380 will be found to be a valid boot location (e.g., a geographic location 220), otherwise, the second boot location 1380 will be found to be an invalid boot location (e.g., a geographic location 220'). The second valid boot location 1390 can also be understood as a boot location within a second safe zone 1330 defined with respect to the second predetermined location 1370. The invalid boot location (e.g., a geographic location 220') may be a boot location further than a second predetermined distance from the second predetermined location. The invalid boot location can also be understood as a boot location outside the second safe zone 1330.

In another example, a computing apparatus 1300 may be pre-configured with more than one predetermined location 210. This may be the case, for example, when it is not known at the time of the pre-configuration where the computing apparatus 1300 will be installed. This may be the case, for example, when more than one computing apparatus 1300 is meant to be delivered to various different predetermined locations 210, and when it is not known at the time of the pre-configuration, which computing apparatus 1300 will be delivered to which of the multiple possible predetermined locations 210.

When one of the computing apparatus 1300 is first boot up or activated, a location validation process may be performed according to one of the examples described above. The computing apparatus 1300 includes a controller that is configured to determine the geographical location 200, 200' of the computing apparatus 1300 at the time of the first boot. When the real-time location 1350, 1380 of the computing apparatus 1300 is found to correspond to at least one of the predetermined locations 1310, 1370 (e.g., a geographic location 220), boot permission is granted for the computing apparatus 1300 to complete the boot process. Such a configuration can also allow the computing apparatus 1300 to be moved back and forth among authorized sites (predetermined locations 210), without the need to update the predetermined location 210 repeatedly.

In another example, the computing apparatus 1300 may be configured such that, while the manufacturer may have provided a first predetermined location 1310, a trusted party (e.g., the customer) may provide one or more additional second predetermined locations 1370 at a later time. The computing apparatus 1300 may be configured to accept/receive one or more additional second predetermined locations 1370 from a Smartcard.

The controller may be configured to receive more than one predetermined location 210 and be further configured to disable the computing apparatus 1300 if the geographical location (e.g., a geographic location 220') of the computing apparatus 1300 does not correspond to at least one of the more than one predetermined location 210. In some embodiments, the controller is configured to perform a boot process that is configured to disable the computing apparatus 1300 if the geographical location 1305 (e.g., a geographic location 220') of the computing apparatus 1300 does not correspond to a last received predetermined location 1370.

It will be understood that a computing apparatus according to embodiments of the present disclosure may also include mobile devices. For example, the predetermined location 210 may be a designated address provided by the customer. The mobile device may be pre-configured before it is delivered to the customer. The mobile device may be configured to perform the location validation process according to one of the embodiments provided above, at the time of the activating the product. An attempt at a time to activate the mobile device can be successful only if the geographical location 220 of the mobile device at that time corresponds to the predetermined location 210.

The computing apparatus may further be configured such that, upon successful activation, the location validation process is no longer executed in subsequent powering on of the computing apparatus. Thus, a mobile device known to be thus configured may help to deter parcel theft in this age of online shopping.

This disclosure has been presented for purposes of illustration and description but is not intended to be exhaustive or limiting. Many modifications and variations will be apparent to those of ordinary skill in the art. The example embodiments have been chosen and described in order to explain principles and practical application, and to enable others of ordinary skill in the art to understand the disclosure for various embodiments with various modifications as are suited to the particular use contemplated. Thus, although illustrative example embodiments have been described herein with reference to the accompanying figures, it is to be understood that this description is not limiting and that various other changes and modifications may be effected therein by one of ordinary skill in the art without departing from the scope of the disclosure.

While the present technology has been described in each form, the technical scope of the present technology is not limited to the scope of the above-described aspects and various combinations, changes, or improvements can be added without departing from the scope of the technology. The forms to which the combinations, changes, or improvements are added shall also be included in the technical scope of the present technology.

Embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

The invention claimed is:

1. A computing apparatus, comprising:
   a controller; and
   a memory configured to store code executable by the controller to:
   upload a predetermined location for storage in the memory,
   determine whether a geographical location of the computing apparatus corresponds to the predetermined location,
   perform a boot process for booting up the computing apparatus for a first time subsequent to the predetermined location being uploaded for storage in the memory in response to the geographical location of the computing apparatus corresponding to the predetermined location, and
   disable the boot process from booting up the computing apparatus for the first time subsequent to the predetermined location being uploaded for storage in the memory in response to the geographical location of the computing apparatus failing to correspond to the predetermined location.

2. The computing apparatus of claim 1, wherein the geographical location of the computing apparatus is determined from satellite-based location data.

3. The computing apparatus of claim 2, further comprising:
   a satellite receiver coupled to the controller,
   wherein the satellite receiver is configured to receive satellite-based location data.

4. The computing apparatus of claim 1, wherein the controller is configured to retrieve data corresponding to the predetermined location from the memory.

5. The computing apparatus of claim 4, wherein the memory comprises firmware embedding the data corresponding to the predetermined location.

6. The computing apparatus of claim 4, wherein:
   the memory forma a portion of a trusted platform module (TPM) chip disposed in the computing apparatus; and
   the TPM chip is configured to control retrieval of the data corresponding to the predetermined location from the memory.

7. The computing apparatus of claim 1, wherein the geographical location of the computing apparatus is a real-time location of the computing apparatus at a time of determining if the geographical location of the computing apparatus corresponds to the predetermined location.

8. The computing apparatus of claim 1, further comprising:
   an interface coupled to the controller,
   wherein the controller is further configured to receive the geographical location of the computing apparatus via the interface during the boot process of the computing apparatus for the first time subsequent to the predetermined location being uploaded for storage in the memory.

9. The computing apparatus of claim 8, wherein the geographical location of the computing apparatus is received prior to completing the boot process of the computing apparatus for the first time subsequent to the predetermined location being uploaded for storage in the memory.

10. The computing apparatus of claim 8, wherein the boot process of the computing apparatus for the first time ever comprises a unified extensible firmware interface (UEFI) boot process.

11. The computing apparatus of claim 8, wherein the controller is configured to disable the computing apparatus by terminating the boot process of the computing apparatus for the first time subsequent to the predetermined location being uploaded for storage in the memory.

12. The computing apparatus of claim 11, wherein the controller is configured to disable the computing apparatus by denying permission to continue with the boot process of the computing apparatus for the first time subsequent to the predetermined location being uploaded for storage in the memory.

13. The computing apparatus of claim 11, wherein the controller is configured to disable the computing apparatus by preventing the computing apparatus from powering on.

14. The computing apparatus of claim 13, wherein the controller comprises a baseboard management controller (BMC).

15. The computing apparatus of claim 1, wherein the data corresponding to the predetermined location is derived from satellite-based location data.

16. The computing apparatus of claim 15, wherein the data corresponding to the predetermined location is a zone derived from satellite-based location data.

17. The computing apparatus of claim 16, wherein the controller is further configured to determine whether the geographical location of the computing apparatus corresponds to the predetermined location by determining whether the geographical location of the computing apparatus is within the zone.

18. The computing apparatus of claim 1, wherein the controller is configured to:

upload more than one predetermined location for storage in the memory;

disable the computing apparatus in response to the data corresponding to the geographical location of the computing apparatus failing to correspond to the data corresponding to at least one of the more than one predetermined location; and disable the computing apparatus in response to the geographical location of the computing apparatus failing to correspond to a last received predetermined location.

19. A method, comprising:

uploading a predetermined location for storage in memory;

determining, by a processor of a computing apparatus, whether a geographical location of the computing apparatus corresponds to the predetermined location;

performing a boot process for booting up the computing apparatus for a first time subsequent to the predetermined location being uploaded for storage in the memory in response to the geographical location of the computing apparatus corresponding to the predetermined location; and disabling the boot process from booting up the computing apparatus for the first time subsequent to the predetermined location being uploaded for storage in the memory in response to the geographical location of the computing apparatus failing to correspond to the predetermined location.

20. A computer program product comprising a non-transitory computer-readable storage medium configured to store code executable by a processor, the executable code comprising code to perform:

uploading a predetermined location for storage in memory;

determining whether a geographical location of a computing apparatus corresponds to the predetermined location;

performing a boot process for booting up the computing apparatus for a first time subsequent to the predetermined location being uploaded for storage in the memory in response to the geographical location of the computing apparatus corresponding to the predetermined location; and disabling the boot process from booting up the computing apparatus for the first time subsequent to the predetermined location being uploaded for storage in the memory in response to the geographical location of the computing apparatus failing to correspond to the predetermined location.

\* \* \* \* \*